Nov. 13, 1956 P. F. SHIVERS 2,770,699
THERMOSTATIC CONTROL DEVICE
Filed June 23, 1955 3 Sheets-Sheet 1

INVENTOR.
PAUL F. SHIVERS
BY
HIS ATTORNEY

Nov. 13, 1956    P. F. SHIVERS    2,770,699
THERMOSTATIC CONTROL DEVICE
Filed June 23, 1955    3 Sheets-Sheet 2

INVENTOR.
PAUL F. SHIVERS
BY
HIS ATTORNEY

Nov. 13, 1956  P. F. SHIVERS  2,770,699
THERMOSTATIC CONTROL DEVICE
Filed June 23, 1955  3 Sheets-Sheet 3

INVENTOR.
PAUL F. SHIVERS
BY
HIS ATTORNEY

United States Patent Office 2,770,699
Patented Nov. 13, 1956

2,770,699

THERMOSTATIC CONTROL DEVICE

Paul F. Shivers, Minneapolis, Minn., assignor to Robertshaw-Fulton Controls Company, Greensburg, Pa., a corporation of Delaware Application June 23, 1955, Serial No. 517,511

11 Claims. (Cl. 200—138)

This invention relates to devices for controlling room temperature and more particularly to wall type thermostats for automatically controlling room temperature.

In devices of this character it has been customary to provide a bimetallic element which will operate a switch in response to temperature variations of the surrounding medium. The switch is usually connected in an electric circuit to control energization of a solenoid valve which controls the supply of fuel to a burner. The switch may be either the open contact type or the sealed mercury type depending on the type of system utilized.

The system utilized in connection with the thermostat may be either the self-generating type or line energized type. In the self-generating or pilot generator system, the current generated by a thermoelectric device is amplified sufficiently to operate a solenoid valve, the energization of which is controlled by the thermostat. In the line energized system, the solenoid is operated by line voltage and the thermostat is connected in the circuit therewith to control energization of the solenoid. Thermostats having open contact type of switches are generally satisfactory in a line energized system since a comparatively high voltage is used. However, self-generating systems are of extremely low voltage and the pilot output is resultingly small. The voltage consideration, which is less than one volt, indicates that open contact switches are undesirable because of variable resistance at the point of break and accumulation of dust. Mercury switches which do not have such variables are consequently more applicable to the self-generating system than the open contact switches.

However, several disadvantages have limited the use of mercury switches in a self-generating system. The most limiting factor is the size of the bimetal needed to actuate the mercury switch. In order that the best heat exchange between the bimetal element and surrounding air may be had, it is necessary to limit the mass of the bimetal to the smallest amount which will do the necessary work within the prescribed limits of temperature differential and rate of heat transfer. A straight bimetal blade, thin and wide, usually will give the optimum response. However, a straight blade will not permit a small compact design. A curved blade bent into a horseshoe or spiral will permit of a smaller design, but some of the good rate of response is lost because of the shielding of one part of the bimetal by another part, as in the spiral scroll.

If a mercury switch is to be mounted directly on the bimetal, then the bimetal must be given such width and thickness as will properly support the weight of the switch. This has resulted in the use of relatively thick bimetal of considerable length, which results in the necessity of the use of a spiral scroll. The turns of the spiral are of necessity close together and access to the surrounding air is practically limited to that which impinges the edges of the metal. The mass of such a spiral element is necessarily greater than is needed to produce the necessary motion and do the necessary work by moving the switch if the load of the switch is not carried by the bimetal.

The customary thermostats utilizing mercury switches generally incorporate either the spiral scroll bimetal element or the straight bimetal element of considerable length which have the disadvantages described above. It is an object of this invention to overcome the disadvantages of the mercury switch type of thermostat by indirectly connecting the bimetal and mercury switch whereby the weight of the mercury switch is not supported by the bimetal.

Another object of this invention is to mount a bimetal element and mercury switch so that substantially the entire surface of the bimetal element is exposed directly to the surrounding air.

Another object of this invention is to incorporate in a wall thermostat, an improved adjustment means by which a thermostatic element may be adjusted without affecting the calibration thereof.

Another object of this invention is to incorporate in wall thermostat, an anticipating type of heater for supplying auxiliary heat to the temperature responsive element.

Another object of this invention is to devise an improved mercury switch thermostat having a minimum number of parts.

In one preferred embodiment of the invention, a U-shaped bimetal element is mounted on a support which is pivoted on a suitable base. A mercury switch, operatively connected to one end of the bimetal element, is positioned between the legs of the bimetal element and pivoted on the support. An anticipating heater is positioned in heating relation to the bimetal element and connected in an electric circuit with the mercury switch to be energizable thereby. Manual means are provided for rotating the assembly of the support, bimetal element and mercury switch to vary the angular position thereof.

Other objects and advantages will become apparent from the following description taken in connection with the accompanying drawings wherein.

Figure 1:
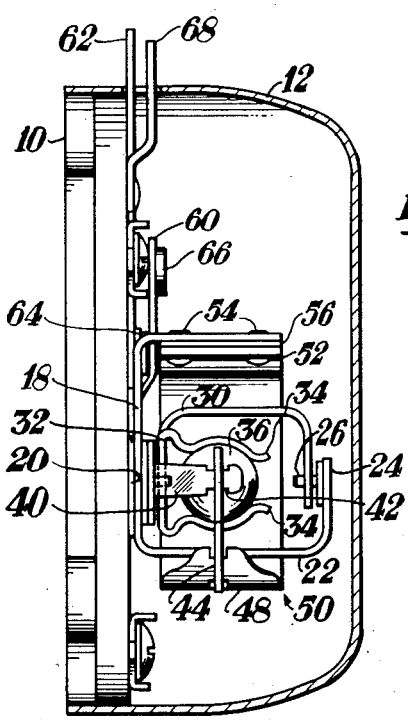
Fig. 1 is a side view of the control device embodying this invention with the cover cut away.
Figure 3:
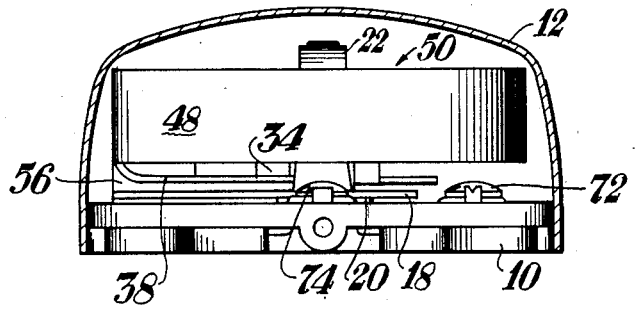
Fig. 3 is a bottom view of the control device with the cover cut away.

Referring more particularly to Figs. 1 and 3, the thermostat includes a base 10 of insulating material to which a suitable cover 12 may be attached by any suitable means. The cover 12 may be provided with vents in the front and sides to permit circulation of air through the interior of the thermostat.

Referring now to Fig. 3 which is a bottom view of the thermostat with the cover 12, the control mechanism can be seen to include a main supporting member 18 which is pivoted on the base 10 by a pivot 20 for oscillating movement thereon. The supporting member 18 defines a support 22 of generally U-shaped configuration having an overlying leg 24 spaced from the pivot 20 by the medial portion of the support 22 to define a second or upper pivot 26 on the end thereof which is in axial alignment with the pivot 20.

A second pivotal support 30 of generally U-shaped configuration has the legs thereof positioned between the legs of the bracket 22, one of the legs being pivoted on the upper pivot 26 and the other leg being pivoted on the lower pivot 20. The support 30 is mounted for pivotal movement about the axis defined by the pivots 20, 26 and may pivot relative to the support 18 on the pivots 20, 26.

A bracket 32 having a plurality of spaced spring clips 34 is fixed to the lower leg of the support 30 for pivotal movement therewith. A mercury switch 36 is supported between the spring clips 34 and held in a fixed position relative to the support 30 by the inherent bias of the spring clips 34. An arm 38 formed on the support 30 extends therefrom to define an upturned portion 40 which is provided with a neck 42. The neck 42 is positioned in a suitable slot in one end of a connecting link 44 and loosely connects the upturned portion 40 with the connecting link 44. The other end of the connecting link 44 extends laterally from the upturned portion 38 and is similarly loosely connected to one leg 48 of a generally U-shaped bimetallic thermal element 50.

The bimetallic thermal element 50 is formed of the customary dissimilar metals which will cause variation in shape of the element 50 in response to temperature variations. In this invention the bimetal element 50 is positioned to substantially enclose the mercury switch 36 and have the entire surface thereof presented to the surrounding air to render the device more sensitive to temperature changes in the room. By positioning the mercury switch 36 between the legs 48, 52 of the bimetal element 50 as shown, the sensitivity of the device is substantially increased.

The other leg 52 of the bimetal element 50 is attached by suitable means, such as rivets 54 to a bracket 56 which is defined by the main supporting member 18. Thus, one leg of the bimetal element 50 is fixed to support 18 and the other end thereof connected to the pivotal support 30 by the link 44. The arrangement is such that an increase in temperature of the bimetal element 50 will cause the leg 48 to deflect away from the leg 52 to cause movement of the link 44 downward as viewed in Fig. 2 which in turn will cause counterclockwise pivoting of the support 30 and mercury switch 36.

To provide a more even adjustment of temperature, an anticipating heater 58 is positioned between the bracket 56 and the leg 52 and may be connected in an electric circuit with the mercury switch 36 so as to have the energization thereof controlled by the switch 36. When energized by operation of the mercury switch 36, the element 58 will transmit heat to the bimetal element 50 to accelerate its action and effectively anticipate the temperature condition which will exist in the room. Anticipating heaters of this type are well known in the art and further description is deemed unnecessary.

To enable the angular position of the support 18 to be adjusted to vary the temperature at which the device will respond, a pair of arms 60, 60 are formed on the main support 18 to extend therefrom. A lever 62 is pivoted on the base 10 by a pivot 64 and provided with an eccentric 66 which is positioned between the arms 60, 60 and in engagement therewith. The free end of the lever 62 extends exteriorly of the base 10 and cover 12 to enable manual manipulation thereof. The base 10 carries a suitable scale member 68 adjacent the upper end thereof which may have graduations thereon calibrated in degrees of the temperature range over which the thermostat will operate. The end of the lever 62 extends slightly past the scale member 68 and may be provided with a suitable index marking alignable with the graduations on the scale member 68.

Should the lever 62 be manually rotated, the eccentric 66 will also be rotated about the pivot 60 to cause rotation of the support 18 about the pivot 20. Since the bimetal element 50, mercury switch 36, and support 30 are in effect mounted on the support 18, it can be seen that rotation of the support 18 varies the angular position of the assembly of bimetal element 50, switch 36 and support 30. Variation of the angular position of the mercury switch 36 modifies the movement necessary by the bimetal element 50 to cause bridging of the contacts withing the switch 36 and thus, the temperature at which the device will respond.

The base 10 is provided with three terminal posts 70, 72, 74 which enable the thermostat to be connected in an electric circuit. For normal operation one side of the heater 58 is connected to the terminal 70 by a lead wire 76, the other side of the heater 58 being connected to the terminal 72 by a lead wire 78. A lead wire 80 connects the terminal 72 to one terminal of the mercury switch 36 and a lead wire 82 connects the other terminal of the mercury switch to the terminal post 74.

Figure 2:
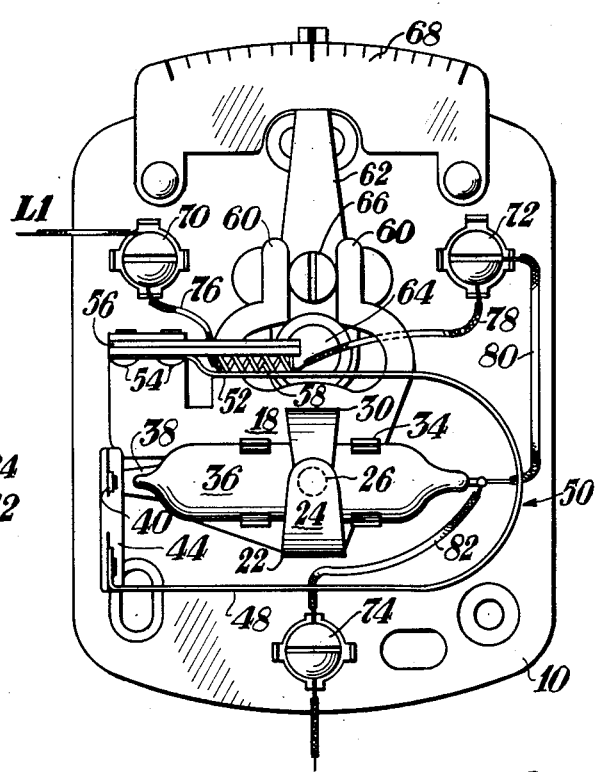
Fig. 2 is a front view of the control device with the cover removed.

In operation of the embodiment shown in Figs. 1, 2 and 3, the terminals 70, 74 may be connected to wires L1, L2 respectively of an electric circuit which may be energized by a source of line voltage or a thermocouple or thermopile. The base 10 may be suitably attached to a wall of the house requiring thermostatic control.

As shown in Fig. 1 the lever 62 is positioned in the medial portion of the operating temperature range indicated on the scale member 68. Assuming now that the temperature of the room in which the thermostat is located corresponds to the temperature indicated by the scale member 68, it will be apparent that the mercury switch 36 will be in an open position and no current will flow from the terminal 72 to terminal 74. The heater 58 being connected in series with the mercury switch 36 will not be energized and the temperature of the bimetal element 50 will be substantially the same as the room temperature.

Should the temperature of the room decrease, the air circulating through the thermostat will cause a corresponding decrease in the temperature of the bimetal element 50, and the leg 48 of the element 50 will flex upward to cause clockwise pivoting of the support 30 and mercury switch 36 to a new angular position. Pivoting of the mercury switch 36 causes bridging of the contacts therein by the mercury to energize the electric circuit and cause heat to be supplied to the room.

Upon closing of the mercury switch 36, the heater 50 is also energized to supply heat to the bimetal element 50, and as the bimetal element 50 is heated by the heater 58, the leg 48 will be flexed downward to cause counterclockwise pivoting of the mercury switch 36, until the switch 36 has tilted sufficiently to open the contacts therein. In this manner the contacts will be opened faster than ordinarily or without the heating element 58. Thus, the heater 58 will anticipate the temperature condition of the room and prevent overshooting of the temperature.

It is to be understood that the lead wire L1 may be readily connected to terminal 72 to omit the heater 58 from the circuit and eliminate the anticipating effect thereof.

It is to be noted that the novel position of the mercury switch 36 between the legs 48, 52 of bimetal element 50 permits substantially the entire surface of the bimetal element 50 to be subject to the room air circulating through the thermostat. This novel arrangement renders the device more sensitive and greatly increases the applications for which it may be used.

Figure 4:
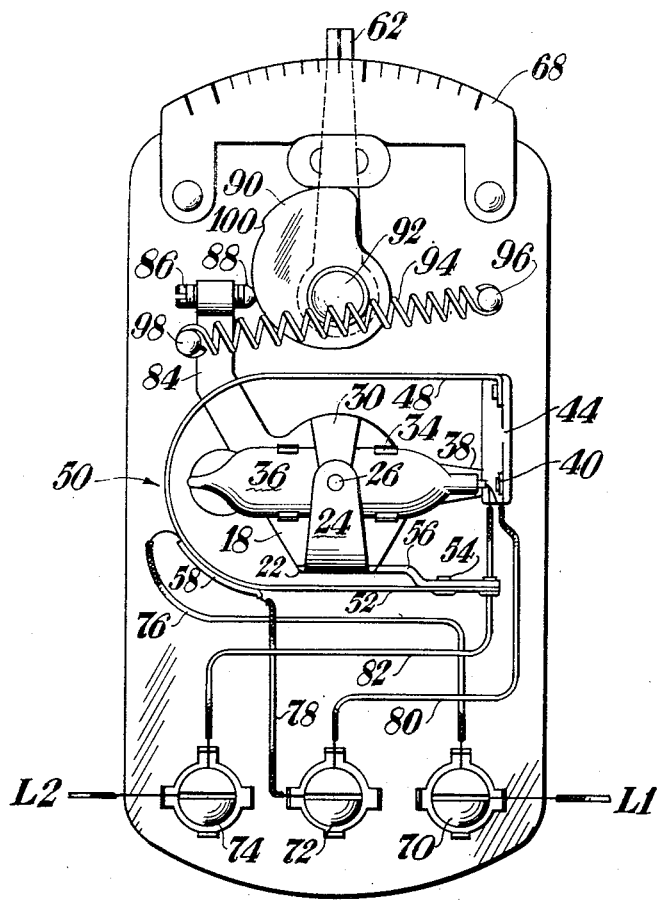
Fig. 4 is a front view with the cover removed showing another embodiment of the invention.

The embodiment of the invention shown in Fig. 4 differs from the embodiment shown in Fig. 1 in that cam means are provided for varying the angular position of the support 18 and the bimetal element 50 is repositioned to accommodate the cam adjustment means.

More particularly, the bimetal element 50 is reversed so that the leg 52 is now fixed to the support 18 on the lower side of the mercury switch 36 and the terminals 70, 72 and 74 are positioned in alignment on the lower portion of the base 10. The heating element 58 is positioned on the leg 52 as before, but modified slightly in that it is cemented on the leg 52 to obtain maximum heat transfer to the bimetal.

The support 18 is provided with a single arm 84 extending therefrom and has an adjustment screw 86 threaded through the end thereof. The screw 86 is provided with a rounded end 88 which engages the surface of a cam 90. The cam 90 is of the constant rise type and is fixed to the end of the lever 62 which is pivoted on the base 10 by a pivot 92. The cam 90 is positioned to be concentric with the pivot 92 and rotates about the pivot 92 with the lever 62. A spring 94 is mounted in tension having one end attached to a pin 96 fixed to the base 10 while the other end is attached to a pin 98 carried by the arm 84. The screw 86 is biased into engagement with the surface of the cam 90 by the spring 94 and thus acts as an accurate cam follower.

Should the lever 62 be rotated about the pivot 92, the constant rise surface of the cam 90 will cause movement of the screw 86 to vary the angular position of the support 18 and thus the angular position of the mercury switch 36 and bimetal element 50.

The cam 90 is also provided with a raised surface or hump 100 which engages the screw 86 when the lever 62 is at the extreme left of its travel. This serves to quickly tip the mercury switch through a large angle so that a great temperature reduction is required to bring the switch back to normal operating position and in effect provides a positive "off" position for the device.

The operation of the embodiment shown in Fig. 4 is the same as described for the embodiment of Fig. 1 except for the adjustment means and further description is unnecessary.

Figure 5:
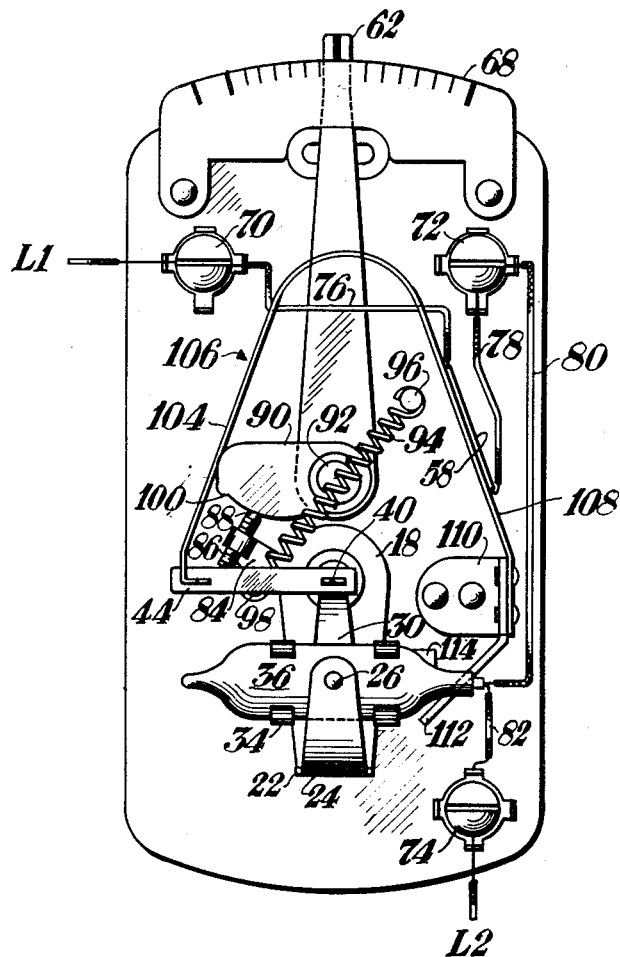
Fig. 5 is a front view with the cover removed showing still another embodiment of the invention.

The embodiment of the invention shown in Fig. 5 differs from that shown in Fig. 3 in that the bimetallic element is substantially V-shaped and a different mounting and pivoting means for the mercury switch is utilized.

More particularly the support 18 is pivoted on the base 10 by the pivot 20 as before for pivotal movement. The support 18 also defines an overlying leg 24 provided with a pivot 26, but in this embodiment, the pivot 26 is axially aligned with a second pivot 26 (not shown) carried on the lower portion of the support 18 and spaced from the upper pivot 26. The U-shaped pivotal support 30 is positioned between and pivoted on the pivots 26, 26 and carries the mercury switch bracket 32 as before. Thus, in this embodiment, the support 18 rotates about the axis defined by the pivot 20 while the support 30 may rotate independently of the support 18 about another axis defined by the pivots 26, 26.

The upturned portion 40 of the support 30 is connected to one leg 104 of a V-shaped bimetal element 106 by the connecting link 44 in the same manner as in Fig. 2.

The other end 108 of the bimetal element 106 is fixed to a support 110 which in turn is fixed to the base 10. Thus, in this embodiment the bimetal element is fixed at one end rather than being mounted on a pivotal support as shown in Figs. 1, 2 and 3. The support 110 is also provided with an extension 112 which is positioned to be engaged by an extension 114 of the support 30 when the lever 12 is in the "off" or extreme left position. This provides a positive shutoff by holding the mercury switch in its open position.

The adjustment means and anticipating heating means of this embodiment are substantially the same as shown in Fig. 4 and hereinbefore described.

In operation of the embodiment shown in Fig. 5, the terminals 70, 74 are connected to wires L1, L2 respectively as shown for Fig. 1. Assuming now that the temperature of the room in which the thermostat is located corresponds to the temperature indicated by the scale member 68, it will be apparent that the mercury switch 36 will be in an open position and no current will flow from the terminal 72 to terminal 74.

Should the temperature of the room decrease, the air circulating through the thermostat will cause a corresponding decrease in the temperature of the bimetal element 106 and the leg 104 of the element 106 will flex toward the leg 108 to cause movement of the link 44 to the right and clockwise pivoting of the support 30 about the axis defined by pivots 26, 26. This will tilt the mercury switch 36 sufficiently to cause bridging of the contacts therein and energization of the electric circuit which causes heat to be supplied to the room.

Upon closing of the mercury switch 36, the heater 58 is also energized to supply heat to the bimetal element 50 as described in connection with the embodiment shown in Figs. 1, 2 and 3.

Should the lever 62 be rotated from its medial position to a higher temperature setting, the support 18 will be rotated clockwise about the axis defined by pivot 20 by the cam 90. Rotation of the support 18 causes the pivots 26, 26 to swing counterclockwise about the axis defined by the pivot 20 carrying therewith the mercury switch support 30 and mercury switch 36 to a new angular position.

The connection between the upturned portion 40 and link 44 has sufficient clearance to allow rotational freedom of the upturned portion 40 relative to the link 44, without affecting the position of the link 44 or bimetal element 106.

Should the lever 62 be rotated to the extreme left or "off" position the screw 86 will engage the raised surface 100 to tip the mercury switch through a large angle so that a great temperature reduction is required to bring the switch back to normal operating position. Also in this position of the lever 62, the extension 112 of the support 110 engages the extension 114 of the support 30 and provides a positive shutoff by holding the support 30 in its "off" position.

While only three embodiments of the invention have been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In a thermostatic control device, the combination comprising control means including a mercury switch movable from one position to another, a bimetallic thermal element substantially enclosing said control means and having at least a portion thereof movable in response to temperature variations affecting said element, and an operative connection between said movable portion and said control means for transmitting movement therebetween.

2. In a thermostatic control device, the combination comprising a pivotally mounted mercury switch movable from one angular position to another for controlling the flow of electric energy, a bimetallic element operatively connected to said mercury switch for varying the angular position of said mercury switch in response to variations in temperature of said bimetallic element, and manually operable means for varying the angular position of said mercury switch, said bimetallic element being bent to substantially enclose said mercury switch whereby substantially the entire surface of one side of said bimetallic element will be directly exposed to the surrounding air.

3. A thermostatic control device comprising a casing, a support pivotally mounted on said casing, a mercury switch pivotally mounted on said support and movable from one angular position to another for controlling the flow of electric energy, a curved bimetal element positioned on said support and substantially enclosing said mercury switch, said element having one end mounted on said support and the other end thereof operatively connected to said switch, an electric resistance in heating relationship to said element, means for energizing said resistance, and manual means operatively connected to said support for varying the angular position thereof.

4. A thermostatic control device as claimed in claim 3 wherein said manual means comprise a lever pivoted on said casing, an eccentric mounted on said lever, and a pair of arms projecting from said support and engaging said eccentric.

5. A thermostatic control device as claimed in claim 3 wherein said manual means comprises a lever pivoted on said casing, a cam surface associated with said lever, and a follower for said cam surface connected to said support, said follower being biased into engagement with said cam surface.

6. A thermostatic control device as claimed in claim 3 wherein said bimetal element is generally U-shaped.

7. A thermostatic control device comprising a support, a mercury switch pivotally mounted on said support, and a curved bimetal strip mounted at one end on said support and having the other end thereof pivotally connected to said mercury switch for causing rotation of said support in response to temperature variations of said bimetal strip, said bimetal strip having sufficient curvature to substantially enclose said mercury switch and having substantially its entire surface exposed to the surrounding air.

8. A thermostatic control device as claimed in claim 7 wherein said bimetal strip is generally V-shaped.

9. A thermostatic control device as claimed in claim 7 wherein means is provided for holding said mercury switch in one angular position regardless of temperature variations of said bimetal strip.

10. A thermostatic control device comprising a base, a support pivotally mounted on said base, a mercury switch pivotally mounted on said support and pivotable independently of said support, and a curved bimetal strip substantially enclosing said support and mercury switch and having one end thereof mounted on said base and the other end thereof operatively connected to said mercury switch for varying the angular position of said mercury switch in response to variations in temperature of said bimetal strip.

11. In a thermostatic control device, the combination comprising a pivotally mounted support, a substantially U-shaped bimetal element mounted at one end on said support, a mercury switch pivotally mounted on said support and positioned between parallel legs of said bimetal element, said mercury switch being operatively connected to said bimetal element to be moved from one angular position to another in response to a variation in temperature of said bimetal element, and manually operable means for varying the angular position of said support.

References Cited in the file of this patent

UNITED STATES PATENTS

| | | |
|---|---|---|
| 1,558,277 | Phelan et al. | Oct. 20, 1925 |
| 1,676,922 | Phelan | July 10, 1928 |
| 1,780,302 | Koch et al. | Nov. 4, 1930 |
| 2,593,268 | Clark | Apr. 15, 1952 |